United States Patent
Chazalet et al.

(10) Patent No.: US 9,866,533 B2
(45) Date of Patent: Jan. 9, 2018

(54) SECURED CLOUD DATA STORAGE, DISTRIBUTION AND RESTORATION AMONG MULTIPLE DEVICES OF A USER

(71) Applicant: France Telecom, Paris (FR)

(72) Inventors: Boris Chazalet, London (GB); Tansir Ahmed, Ilford (GB)

(73) Assignee: ORANGE, Paris (FR)

( * ) Notice: Subject to any disclaimer, the term of this patent is extended or adjusted under 35 U.S.C. 154(b) by 125 days.

(21) Appl. No.: 13/932,491

(22) Filed: Jul. 1, 2013

(65) Prior Publication Data

US 2014/0006773 A1 Jan. 2, 2014

(30) Foreign Application Priority Data

Jun. 29, 2012 (EP) .................................... 12305782

(51) Int. Cl.
*H04L 29/06* (2006.01)

(52) U.S. Cl.
CPC ...... *H04L 63/0428* (2013.01); *H04L 63/0464* (2013.01); *H04L 63/0471* (2013.01); *H04L 63/06* (2013.01); *H04L 63/0442* (2013.01)

(58) Field of Classification Search
CPC ............. H04L 63/0428; H04L 63/0464; H04L 63/0471; H04L 63/06
USPC ....................................................... 713/150
See application file for complete search history.

(56) References Cited

U.S. PATENT DOCUMENTS

| 6,587,946 | B1 * | 7/2003 | Jakobsson ...................... 713/180 |
| 7,181,017 | B1 * | 2/2007 | Nagel ................... H04L 9/0825 380/282 |
| 8,316,237 | B1 * | 11/2012 | Felsher et al. ................ 713/171 |
| 8,681,975 | B2 * | 3/2014 | Farrugia ............... H04L 9/0822 380/255 |
| 8,688,973 | B2 * | 4/2014 | Kerschbaum .......... H04L 9/002 380/282 |
| 9,037,545 | B2 * | 5/2015 | Young ................. G06F 11/1004 707/646 |

(Continued)

OTHER PUBLICATIONS

John, T. A., 'Concealing Data Files in the Cloud (Threshold Proxy Re-Encryption Scheme)', IJETIE, vol. I, Issue 3, Mar. 2015, entire document, http://www.ijetie.org/articles/IJETIE_201513025.pdf.*

(Continued)

*Primary Examiner* — Luu Pham
*Assistant Examiner* — Ronald Baum
(74) *Attorney, Agent, or Firm* — David D. Brush; Westman, Champlin & Koehler, P.A.

(57) ABSTRACT

A method is provided to share a content stored on a secured server. The content is associated to a first electronic device and encrypted using a public key of the first electronic device. The secured server stores a first re-encryption key from the first electronic device to a second electronic device. The method is implemented by the secured server and includes the steps of determining association of the content with the second electronic device, re-encrypting the content using the first re-encryption key, sending the content to the second electronic device for encryption using a second device public key and storing the encrypted content received from the second electronic device in association with the second electronic device.

17 Claims, 5 Drawing Sheets

(56) References Cited

U.S. PATENT DOCUMENTS

| | | | |
|---|---|---|---|
| 2006/0282901 A1* | 12/2006 | Li | G06F 21/606 726/26 |
| 2007/0038857 A1* | 2/2007 | Gosnell | G06F 17/30067 713/165 |
| 2007/0136606 A1* | 6/2007 | Mizuno | G06F 21/78 713/189 |
| 2007/0220271 A1* | 9/2007 | Law | G06F 21/606 713/185 |
| 2008/0059787 A1* | 3/2008 | Hohenberger et al. | 713/153 |
| 2008/0063191 A1* | 3/2008 | Hatano | G06F 21/6209 380/45 |
| 2008/0260156 A1* | 10/2008 | Baba | G06F 11/1464 380/277 |
| 2008/0307020 A1* | 12/2008 | Ko | G06F 11/1469 |
| 2009/0210697 A1* | 8/2009 | Chen et al. | 713/153 |
| 2009/0228719 A1* | 9/2009 | Almgren | H04L 63/0428 713/193 |
| 2010/0138671 A1* | 6/2010 | Kim et al. | 713/189 |
| 2010/0210240 A1* | 8/2010 | Mahaffey | H04L 41/0253 455/411 |
| 2010/0318782 A1* | 12/2010 | Auradkar | G06F 11/1451 713/150 |
| 2011/0252071 A1* | 10/2011 | Cidon | G06F 17/30174 707/802 |
| 2012/0191657 A1* | 7/2012 | Weinstein | H04L 67/1095 707/654 |
| 2012/0233453 A1* | 9/2012 | Lev Ran | H04L 63/0428 713/150 |
| 2012/0239942 A1* | 9/2012 | Yan | 713/189 |
| 2012/0310889 A1* | 12/2012 | McNeil | H04L 67/2857 707/639 |
| 2012/0331283 A1* | 12/2012 | Chandran et al. | 713/150 |
| 2013/0275752 A1* | 10/2013 | Zhang et al. | 713/167 |

OTHER PUBLICATIONS

Pawar, N., 'Enforcing Access Policies Using KP-ABE for Data on Entrusted Cloud', IJIRCCE, vol. 5, Issue 3, Mar. 2017, entire document, https://www.ijircce.com/upload/2017/march/90_Enforcing.pdf.*

European Search Report and Written Opinion dated Oct. 11, 2012 for corresponding European Application No. 12 305 782.0, filed Jun. 29, 2012.

Yang Zhang et al., "Access Control as a Service for Public Cloud Storage", Jun. 21, 2012 (Jun. 21, 2012), XP002684839, retrieved from the Internet: URL:http://ieeexplore.ieee.org/stamp/stamp.jsp?tp=&arnumber=6258201.

Ateniese G. et al., "Improved Proxy Re-Encryption Schemes with Applications to Secure Distributed Storage", ACM Transactions on Information and System Security, ACM, New York, NY, US, vol. 9, No. 1, Feb. 1, 2006 (Feb. 1, 2006), pp. 1-30, XP001242926.

Sunil Sanka et al., "Secure Data Access in Cloud Computing", Internet Multimedia Services Architecture and Application (IMSAA), 2010 IEEE 4th International Conference on, IEEE, Dec. 15, 2010 (Dec. 15, 2010), pp. 1-6, XP031929610.

* cited by examiner

SECURED CLOUD DATA STORAGE, DISTRIBUTION AND RESTORATION AMONG MULTIPLE DEVICES OF A USER

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF INVENTION

This invention relates to secured cloud data storage, distribution and restoration among multiple devices of a user, invention based on proxy re-encryption technique.

BACKGROUND

Users are storing their data in network servers or in the cloud for different reasons. This could be to obtain a backup of their personal data, securely stored in a remote location, but also a way to easily access their data from several location or devices, or a way to share data with others users.

One main concern for users is security or data privacy: the stored data must not be accessible to anybody else, not even the service provider. One way of realizing this is to first encrypt data and then upload data to the cloud, this way only the owner of the data is able to access the data, the service provider only manages encrypted data and does not possess the means of decrypting the data (i.e. the cryptography keys), ensuring confidentiality.

A first way of implementing such method is by using symmetric cryptography, that is to say cryptography based on a single secret encryption key; data being encrypted or decrypted using the same secret key. This means that the only way to share data with someone else is to share the secret key, this solution offers no control on how the data stored on the cloud is shared as anyone can then share the secret key enabling access to the data. Moreover, as symmetric key must be exchanged to share data, there is a risk that the key may be compromised during the exchange, thus compromising all encrypted data.

A second way of implementing such method is by using asymmetric encryption, that is to say cryptography based on a pair of keys: a public key—potentially shared with everyone—and a private key—kept secret by the owner. Data encrypted by the public key can only be decrypted using the private key. This method allows sharing of data with a user by using its public key to encrypt data to be shared: only the recipient is able to decrypt, using its private key. As in this method there is no exchange of secret key, the risk of compromising the data is limited.

The previous method presents a strong limitation: when a user wants to share encrypted data stored in the cloud data storage with someone else, he first needs to download said data, decrypt it, re-encrypt the data using the recipient's public key and then upload the data back to the cloud. These operations are very time consuming as bandwidth restriction may make the download and the upload of the data tedious, and the decryption and re-encryption of the data may take time on user device. Moreover, asymmetric encryption is much slower than symmetric encryption.

Hybrid encryption technique reduces some inconvenience of the previous method; hybrid encryption technique being a combination of symmetric and asymmetric encryption. In this technique, the content or data to be stored in the cloud is encrypted using a symmetric key, then said symmetric key is encrypted using an asymmetric encryption. In this solution, both the content encrypted using the symmetric key and said symmetric key encrypted using asymmetric encryption are stored within the cloud. Inconvenience over precedent method are reduced as only the encrypted symmetric key needs to be re-encrypted, that is to say a much smaller file that the content, which preserve both the bandwidth when uploading or downloading the data and the processor time needed to re-encrypt data. Still, if inconveniences of precedent method are reduced, the content—or here the symmetric key associated to the content—still need to be downloaded, decrypted, re-encrypted and uploaded; it is thus impossible to share a content uploaded by a first electronic device with a second electronic device if the first electronic device is not available. It is to be noted that the man skilled in the art will use a different symmetric key for each content, thus, if one symmetric key is compromised, only the content associated to said symmetric key will be compromised.

Figure 1:
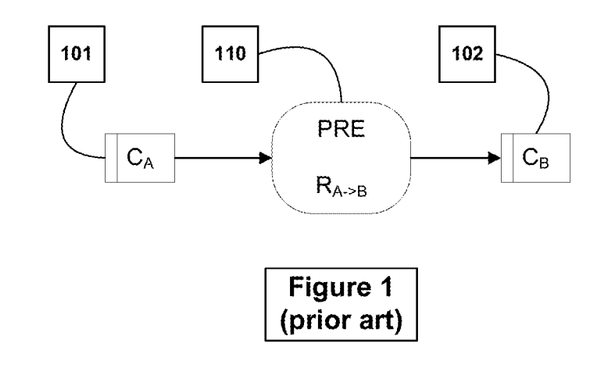
FIG. 1 shows the known Proxy Re-Encryption principle.

A new encryption technology, called Proxy-Re-Encryption (PRE) solves the previous problem. This technology is described in an article by G. Anteniese, K. Fu, M. Green and S. Hohenberger, "Improved Proxy Re-Encryption Schemes with Applications to Secure Distributed Storage" (in ACM Transactions on Information and System Security—TISSEC, vol. 9, no. 1, pp. 1-30, February 2006). This technology is based on asymmetric encryption, but offers a method to re-encrypt already encrypted data. This solves the previous problem as it exempts the electronic device from downloading the encrypted data, decrypting it, re-encrypting it and then uploading it back to the cloud data storage. PRE allows a direct re-encryption of the data within the cloud. FIG. 1 describes the way PRE works. 101 is data stored in the cloud by a first electronic device, said data being encrypted using a public key of the first electronic device. When the first electronic device wants to share this data with a second electronic device, the first electronic device calculates a re-encryption key, re-encryption key calculated using its own private key and the second user's public key. This re-encryption key is then uploaded to the cloud database server or database server 110. The server 110, using this re-encryption key, re-encrypts the data. The method used does not involve any decryption of the data by the server 110, guaranteeing the privacy of the data. The result, data 102, can be shared with the second electronic device, the second electronic device is then able to decrypt said data 102 using its own private key. PRE method guarantees that no exchange of sensible data occurs as with the method based on symmetric key, and exempt electronic devices from downloading and uploading data they want to share as with the second described method based on asymmetric cryptography. Only public keys need to be exchanged between the users, meaning here between their respective electronic devices used to access the cloud service. A pair of public key and private key is associated to an electronic device, stored within said electronic device. Said electronic devices may exchange directly their public keys via for example Near Field Communication (NFC). One electronic device's private key should not be shared to preserve confidentiality of encrypted data using said electronic device.

Proxy Re-Encryption (PRE) technology can be implemented using "multi-hop" or "single-hop" PRE.

In multi-hop PRE, a content initially encrypted for an electronic device A and re-encrypted using PRE for an electronic device B, can be re-encrypted using PRE by the electronic device B for another electronic device C, and so on. The process of re-encryption from an electronic device to another electronic device can thus be repeated anytime. For example, when data is encrypted and stored within the cloud data storage by a first electronic device A, if a second electronic device B wants to access said data, or if the electronic device A wants to share said data with electronic device B, the electronic device A calculates a first re-encryption key from the electronic device A to a second electronic device B and uploads said first re-encryption key to the cloud data storage. There, using said first re-encryption key, the database server is able to re-encrypt the data and send it to the electronic device B. If a third electronic device C wants to access the data, and when the electronic device A is unavailable (switched off, broken, lost, . . . ), said electronic device A is unable to calculate a re-encryption key from the electronic device A to the electronic device C. But the electronic device B may calculate a second re-encryption key from electronic device B to the electronic device C. Then, the database server may apply multi-hop PRE method using the first then the second re-encryption key on the data encrypted by the electronic device A to obtain encrypted data that can be shared with the electronic device C.

In single hop PRE such possibility does not exist as data re-encrypted a first time cannot be re-encrypted a second time. Thus, in the situation described in the previous paragraph, if the electronic device A is not available to calculate a re-encryption key from the electronic device A to the electronic device C, the data cannot be shared with the electronic device C although at the same time the server can share the data with electronic device B using re-encryption key from electronic device A to the electronic device B. The user in a case to download the data to the electronic device B so that it can be decrypted using the electronic device B private key. After decryption, the content becomes electronic device B content, and the user can resume the upload mechanism to the cloud, starting with the electronic device B encrypting the data content using its public key and then uploading the data to the cloud data storage as data for electronic device B.

Provided the user wants to share the newly uploaded content with an electronic device C, the electronic device B will calculate a re-encryption key from the electronic device B to the electronic device C and uploads said re-encryption key to the database server. Thus, the database server can re-encrypt data uploaded by the electronic device B using the calculated re-encryption key and send the data to the electronic device C. Again, downloading, decrypting, re-encrypting and uploading back the data are very time consuming operations.

If multi-hop PRE thus facilitates sharing of content from one device to others, the initial device may lose control on how its content is shared. Multi-hop PRE brings as a consequence security or privacy concerns. This is why single-hop PRE is preferable. But the gain in security and privacy is lost through strong limitations brought by single-hop PRE on the sharing of content between different electronic devices.

Today there is a need for a re-encryption key management process that avoids such limitations. There is a further need for such a management that facilitates a user's access to his content from different electronic devices, especially to transfer or associate the content from one electronic device to another and to manage situation of an electronic device loss for example.

SUMMARY OF THE PRESENT INVENTION

A method is proposed for secured cloud data distribution and restoration among multiple devices of a user, such method allowing the user to manage its several devices associated to its user account. In this context, data or content is stored within a cloud, i. e. stored within one or more servers, for example database servers or secured servers, and the user possesses at least one user account to access the cloud data storage service, cloud service in short. Several entries are associated to the user account. When a content is stored by one electronic device in the cloud service, it means that the electronic device first encrypts the data using its private key and then uploads said encrypted data to the server. Said encrypted data is stored by the database server within the cloud service in association with the electronic device and the user account.

An embodiment of the present invention describes a method to share a content stored on a secured server, said content being associated to a first electronic device and encrypted using a public key for said first electronic device, the secured server storing a first re-encryption key from the first electronic device to a second electronic device ($R_{1 \rightarrow 2}$), the method being implemented by the secured server and comprising the steps of:

a) Determining association of the content with the second electronic device,
b) Re-encrypting the content using the first re-encryption key,
c) Sending the content to the second electronic device for encryption using a second device public key,
d) Storing the encrypted content received from the second electronic device in association with said second electronic device.

The method allows the cloud service to associate content associated to a first electronic device to a second electronic device. Thus, the content initially stored by the electronic device A can be shared with another electronic device through the electronic device B, even though the electronic device A is no longer available. This method allows a user to manage its content shared by several electronic devices even in the context of a single hop PRE.

In an additional embodiment of the present invention, the method further comprises prior to the step a):

e) Receiving a request from a third device for the content associated to the first electronic device, And wherein the determining of step a) is based on the first electronic device status.

The method described in present invention can be triggered by a request from a third device to access to the first electronic device content when the first electronic device is for example unavailable. Status of the first electronic device can be linked to its availability, meaning that the electronic device is connected or not to the cloud service. Said method solves the problem arising when an electronic device wants to access a content uploaded by an electronic device, said last electronic device being unavailable to calculate the re-encryption key needed.

In an additional embodiment of the present invention, the determining of step a) is based on receiving a request to associate the content associated to the first electronic device to the second electronic device.

The method can also be triggered for any other reason than the first electronic device unavailability. The user may for example connect to the cloud service and access via an interface to a configuration menu offering the possibility to trigger the present invention method, i. e. requesting the secured server to associate the content to a second electronic device. Thus, the user can manage by himself the association of stored content within the cloud database storage.

In an additional embodiment of the present invention, the previous request further comprises a request to delete content associated to the first electronic device.

This possibility can be useful when the user loses, breaks, sells, gives away, etc. the first electronic device as there is no reason to keep content associated to said device. This permits the cloud service to optimize its database storage capacity.

In an additional embodiment of the present invention, the determining of step a) is based on the first electronic device status.

The secured server may trigger the method of present invention based on the first electronic device status. If for example the first electronic device has not been connected to the cloud service for a predetermined time, supposedly a long time, the secured server may trigger the association of the content associated to electronic device A to the electronic device B. This has the advantage of anticipating any further request to access the content associated to electronic device A.

In an additional embodiment of the present invention, the determining of step a) is further based on the second electronic device status.

This is advantageous particularly when the secured server detects for example that the electronic device B is very often connected to the cloud service compared to the electronic device A or that the electronic device B has better processing capacities than electronic device A, as processing capacities are useful during encryption operations in order to reduce the time of said operations.

In an additional embodiment of the present invention, the method further comprises after the step d): the step of:
f) Deleting from the secured server the content being associated to the first electronic device and encrypted using the public key for said first electronic device.

In an additional embodiment of the present invention, the method further comprises after the step d) the step of:
g) Deleting from the secured server any re-encryption keys from or to the first electronic device.

As with previous step of deletion of content associated to the electronic device A, it is advantageous to be able to delete any content or data in relation with electronic device A, especially useful when the user loses, breaks, sells, gives away, etc. said first electronic device. This brings more security and privacy to the system and save data storage space.

The present invention also discloses a secured server for sharing content stored on a database, said content being associated to a first electronic device and encrypted using a public key of said first electronic device, the database server storing a first re-encryption key from the first electronic device to a second electronic device ($R_{1 \rightarrow 2}$), the secured server being arranged to:
determine association of a content with an electronic device;
re-encrypt a content using a re-encryption key;
send a content to an electronic device for encryption using a public key;
store an encrypted content received from an electronic device in association with said electronic device.

Furthermore, another object of the invention concerns a computer program product recorded on a storage medium and executable by a computer in the form of a software agent including at least one software module setup to implement the method of the present invention. This programs can use any programming language, and be in the form of source code, binary code, or of code intermediate between source code and object code such as in a partially compiled form, or in any other desirable form for implementing the methods according to the invention.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to the invention may in particular be downloaded from a network of Internet type.

DESCRIPTION

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

Figure 2:
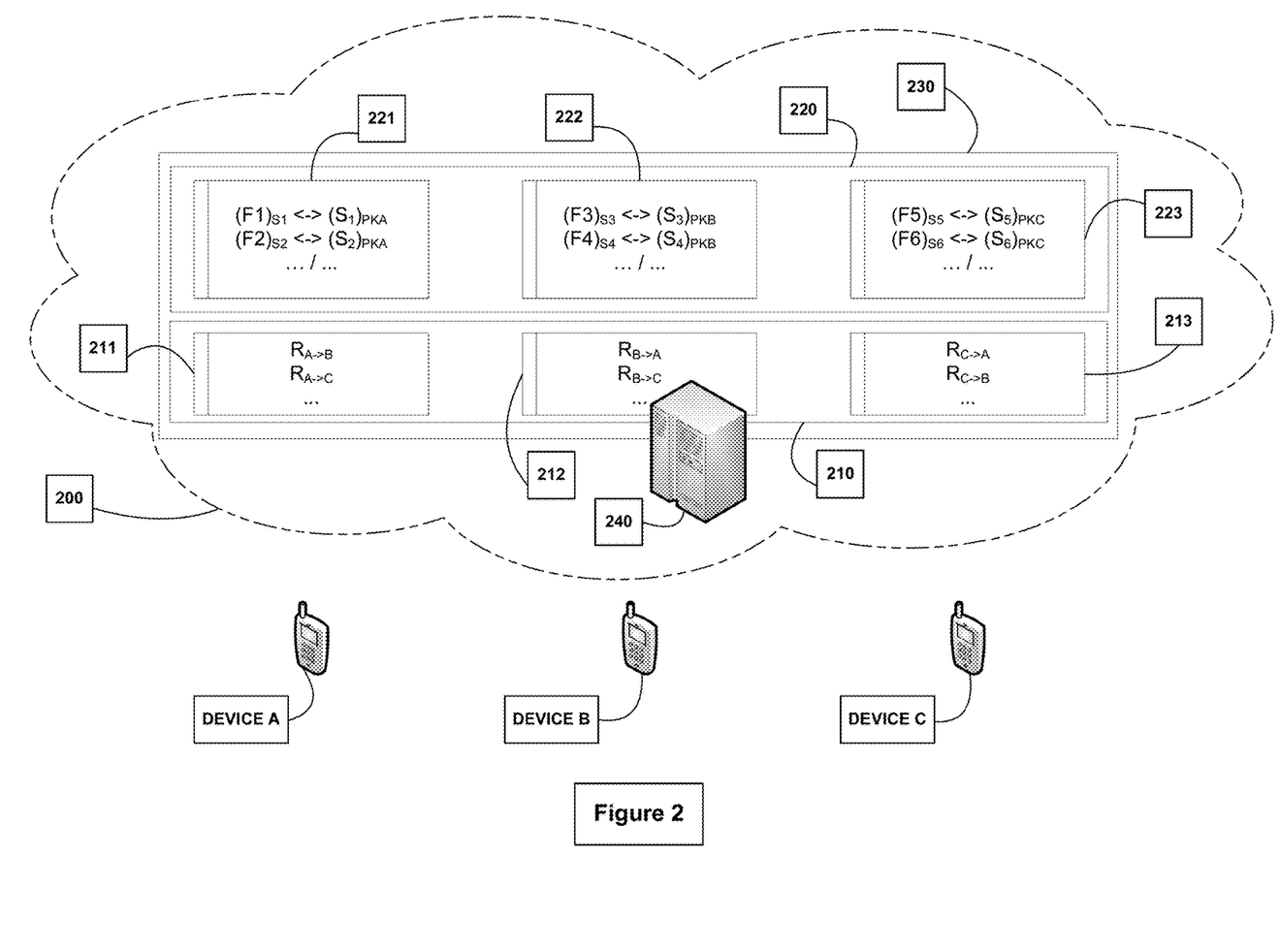
FIG. 2 shows an exemplary embodiment of the present system.

FIG. 2 shows an exemplary embodiment of the present system. Electronic devices A, B and C are here illustrated as mobile devices belonging to the same user. Such user has a subscription to a cloud data storage service 200, in short cloud service, accessible through user credentials or authentication data (associated to his user account), such as a pair of login/password, or any other authentication methods known to the man skilled in the art. Cloud data storage service (or cloud service) 200 can be built on one or more cloud database servers 240 shown in FIG. 2, and described in further details in FIG. 5. The user can access the cloud data storage service 200, more precisely the cloud database server 240, from any of the electronic devices A, B or C, for example the electronic device A. Cloud database server 240 could be, for example, a database server or a secured server, it will be referred to as cloud database server in the following description, but may also be referred to as database server or, in short, secured server. Electronic devices may be for instance a desktop, laptop, smartphone, tablet, more generally a mobile device or any other electronic device with connectivity to access the cloud service through wired lines or wireless connection.

Cloud database server 240 manages a cloud data storage (not shown in FIG. 2) comprising in the present system an entry 230 for the user, and more precisely his user account. The entry 230 may comprise for each electronic device of the user:
 subentries 220 for content, e.g. 221, 222 and 223 respectively for devices A, B and C,
 subentries 210 for re-encryption keys, e.g. 211, 212 and 213 respectively for devices A, B and C, as described here below.

When the user wants to store on the cloud data storage a file or a content F1, more generally data content, available on one of his electronic devices, e.g. a mobile device A, said device A, prior to uploading the content, encrypts the content F1 using a public key PKA associated to the device A. Encryption technology used may be asymmetric, or as described here, hybrid encryption for better performance, or any other encryption technology. In the present description using hybrid encryption for instance, the content F1 is first encrypted using a symmetric key S1, then the symmetric key S1 is encrypted using the public key PKA, both are then uploaded to the cloud database server 240 and stored within its cloud data storage 230, more precisely with subentry 221 associated to the device A. $(F1)_{S1}$ is the content F1 encrypted by the symmetric key S1, $(S1)_{PKA}$ is the symmetric key S1 encrypted using the public key from device A.

More generally, all content uploaded from electronic device A will be associated in the cloud storage to subentry 221. In one embodiment of the present system, subentries 221, 222 and 223 are thus logical identifications of content belonging respectively to devices A, B and C, while being stored within the same data storage of cloud database server 240.

The system comprises also a subentry 210 to store re-encryption keys from one device to another, the re-encryption keys being calculated by the devices then uploaded and stored by the cloud data storage. For instance, the re-encryption keys subentry 211 associated to a device A comprises all the re-encryption keys needed to re-encrypt the content associated to the device A (in subentry 221) using PRE technology, when transferring the content from the device A to another device. Similarly, subentry 212 comprises re-encryption keys associated to the device B and subentry 213 comprises the re-encryption keys associated to the device C. For example, $R_{A \to B}$ is the re-encryption key from the device A to the device B. The device A calculates this re-encryption key $R_{A \to B}$ using PRE technology, calculation is performed by device A using the private key associated to the public key PKA, the private key being only known by the device A, and using the public key PKB from the device B. Device A may learn the public key PKB of device B either directly via device B, via a peer-to-peer exchange using Near Field Communication (NFC) or Bluetooth technology for example. Device A may also learn the public key PKB via the cloud data storage service 200, in this case the public key PKB may be stored in association with the device B subentry 212 or another subentry dedicated to the device public keys (not shown in FIG. 2). Device A may alternatively learn public key PKB via any other service like a Public Key Infrastructure (PKI) system. In an additional embodiment of the present invention, the system 200 may integrate such a PKI system.

All data stored in subentries 220 and 210 are associated to a user account, different users share the cloud data storage but each user has specific data storage spaces or subentries 210 and 220, the user account itself being associated to an entry 230. Within said storage, each content or re-encryption key or any other data to be stored is associated to a device, said device being specifically identified. Any method known to the man skilled in the art may be used to identify a specific device. Different implementations of the present invention may used for example a Media Access Control (MAC) address, an International Mobile Subscriber Identity (IMSI), an International Mobile Equipment Identity (IMEI), a phone number, a randomly generated number or the previously described public key from a device to identify a device. Implementations of present invention may integrate a process to authenticate a given device, based for example on Public Key Infrastructure, said authentication of the device being dependant or not of the user authentication.

Different embodiments of the processes of present invention to manage the user devices are hereafter described.

Figure 3:
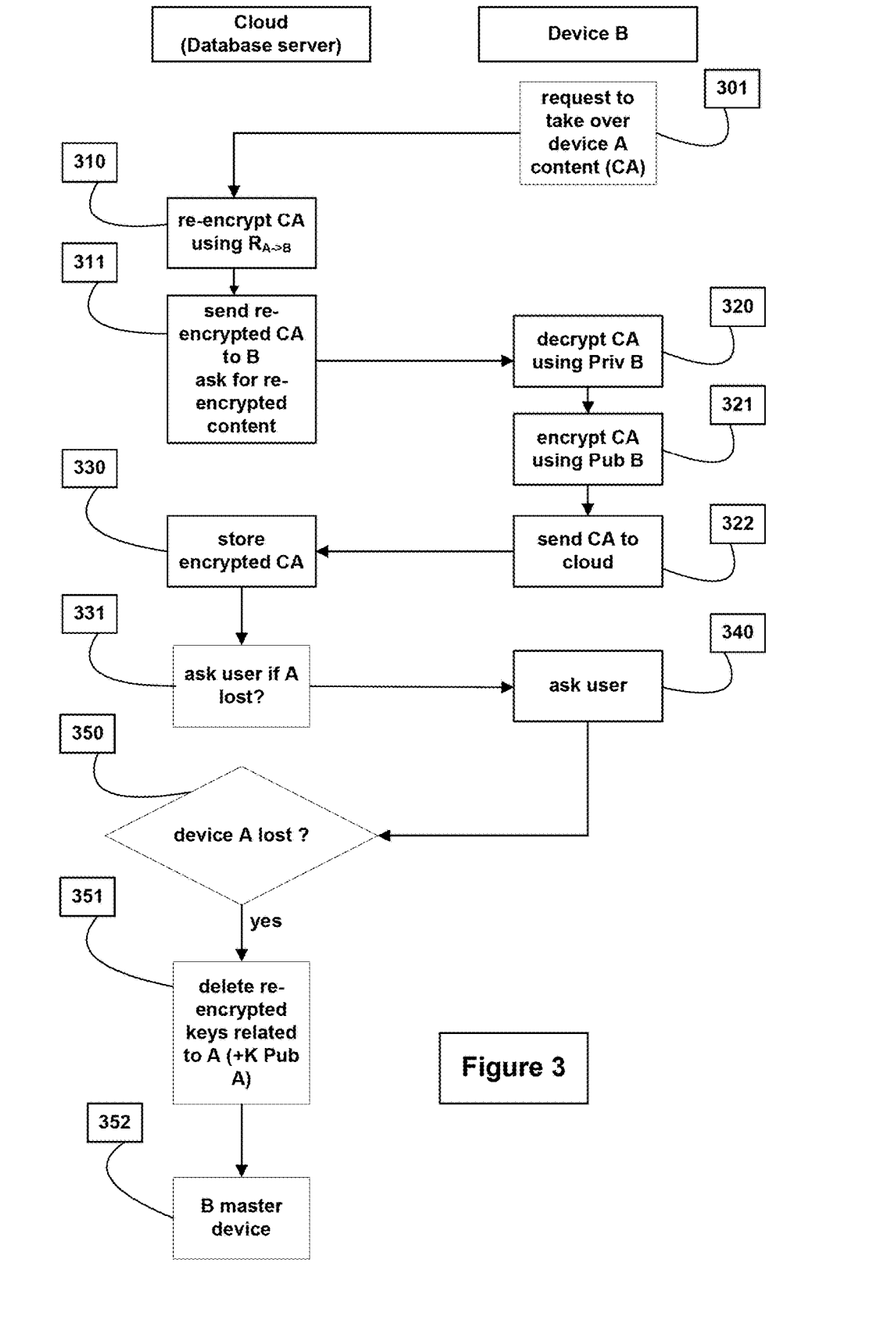
FIG. 3 shows an exemplary embodiment of the process flow of transfer of content association from one device to another.

FIG. 3 shows an exemplary embodiment of the process flow of transfer of content association from one device to another. This method is typically useful if an electronic device A is lost by the user. Apart from the security problem that the electronic device loss may cause, as the electronic device is associated to the user account and is authorized to access the user content, this situation is quite problematic when a single-hop PRE is used. Generally, content stored through the cloud service by the electronic device A may be accessed from any other electronic device associated to the user account. Indeed, the needed re-encryption keys are stored and associated to the user account. But the user will not be able to access the content from an electronic device newly associated to its user account, as the electronic device A is no more available to calculate the re-encryption key from the electronic device A to the new electronic device.

Thanks to the present method, the same content will be accessible to any other electronic device even when the electronic device A is no longer available. The present invention proposes a method to move or to add an association between the content stored in the cloud database by the electronic device A and another electronic device B associated to the user account.

In a first step 301, the electronic device B, logged in to the cloud service, requests the cloud service to be associated with the content of electronic device A. This step may be initiated at user request, via for example an interface to interact with the cloud service, or may be initiated automatically according the electronic device A status for example. The user may want to initiate the process for any reasons like the electronic device A has been lost, or sold, or broken, no longer responding or any other reason. The initiation may be triggered automatically for example when the cloud service detects that the electronic device A has not been available—meaning here connected to the cloud service—for a predefined time. It is to be noted that the electronic device B may be chosen by the user, the user being logged in to the cloud service via said device, or may be chosen by the user via the interface of the cloud service, the user being logged in via another electronic device, or may be automatically chosen by the cloud service according to the electronic device B status. Criteria on electronic device B status may be for example the availability of the electronic device, statistics on its availability or statistics on the quality of the network connection between the cloud service and the electronic device or any other criteria.

The request from electronic device B to be associated with the content of electronic device A actually corresponds to the determination of the association of this content to the second electronic device B. That determination may alternatively be the consequence of the determination of the first electronic device A status as mentioned here before.

Once the cloud database server 240 managing the cloud service receives the request, it will in step 310 re-encrypt the content stored by the electronic device A using the re-encryption key from the electronic device A to the electronic device B. This key has been previously calculated by the electronic device A and stored in association with the user account.

In step 311, the cloud database server 240 then sends the re-encrypted content and a request to the electronic device B asking for said electronic device to re-encrypt the content. In step 320, the electronic device B receives the content and is able to decrypt it using the private key associated to the electronic device B public key. In step 321, the electronic device B will re-encrypt the content using its own public key, and then, in step 322, will upload the re-encrypted content to the cloud service. In step 330, the database server stores the received content in association with the user account in its database, said content being also associated to the electronic device B. The cloud database server may keep a record that the content was initially associated to electronic device A content, but thanks to the steps 301 to 330, the content may be considered now as if it is associated to electronic device B, meaning similarly as content encrypted and uploaded by the electronic device B.

In an additional embodiment of the present invention, the cloud service requests the user to confirm that the electronic device A has been lost, but the situation applies when the electronic device A is not longer responding or lost as seen previously, so the step 331 should be seen as a request from the cloud service as to whether reference to the electronic device A should be suppressed from the cloud service database. In step 340, the electronic device B presents the request of step 331 to the user and registers his answer. It is to be noted that in another embodiment of present invention, such request may be presented to the user in any other electronic device associated to the user account. User answer is sent to the database server in step 350, and in step 351, if the user confirmed that the electronic device A should be suppressed from the cloud service database, the database server will remove from its database the content associated to the electronic device A, all re-encryption keys associated to the electronic device A, that is to say the re-encryption keys from the electronic device A to any other electronic device and the re-encryption keys from any other device to the electronic device A. The association of the electronic device A is removed from the user account, and any other information, such as the public key of the electronic device A or information on electronic device A allowing its identification by the database server are also suppressed. By removing or suppressing data, it should be understood deleting said data or content from the database or cloud data storage. For sake of simplicity, database, cloud data storage, database server or secured server terms are confused when talking about deleting, suppressing or removing content, data or anything from the secured server.

The notion of master device corresponds here to a given device among all associated devices of the user account, the given device being elected to perform a number of tasks, like e.g. the validation of the association of a new device. If the no longer available electronic device A was the master device of the user account, the electronic device B may become the new master device associated to the user account, or any other electronic device associated to the user account may do so. In one embodiment of the present invention, the user may be requested to chose which electronic device associated to its user account is the new master device, in other embodiment, it may be automatic, based for example on the status of the electronic device.

In an additional embodiment of the present invention, the request from electronic device B in step 301 may include that the association to the electronic device A should be suppressed. To do so, in one complementary embodiment of the present invention, all content and data related to the electronic device A may be suppressed after step 311, after for example receiving a confirmation that all the content was securely transferred to the electronic device B. It is to be noted that in another embodiment of present invention, it is possible to have the content uploaded by the electronic device A and the content re-encrypted by the electronic device B as described previously coexisting in the cloud database storage. However, this is not preferred for security reason if electronic device A is lost.

Figure 4:
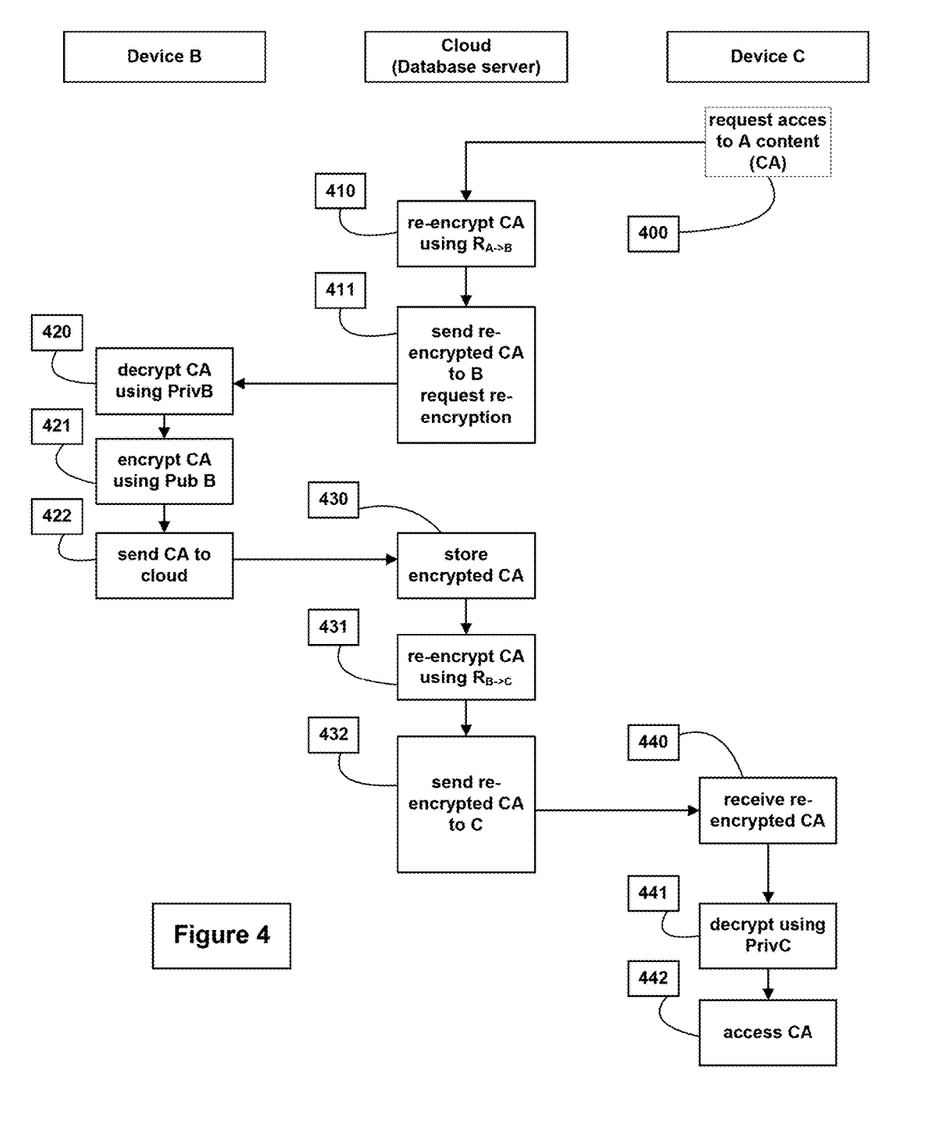
FIG. 4 shows an exemplary embodiment of the process flow for a first device to access content stored in the cloud data storage service by a second electronic device when said second electronic device is unavailable.

FIG. 4 shows an exemplary embodiment of the process flow for a first device to access content stored in the cloud data storage service by a second electronic device when said second electronic device is unavailable. Such situation occurs when an electronic device C is associated to a user account, but, for any reason, the re-encryption key from the electronic device A to the electronic device C is not known by the cloud service. This can happen for example when the user loses the electronic device A. In a first time, the user believes he will find the electronic device A back, and so he does not use the method described in FIG. 3 to associate content from the electronic device A—meaning content uploaded by electronic device A—to another electronic device. Meanwhile, the user associates a new electronic device C, and he wants to access content uploaded by the electronic device A from the newly associated electronic device C. As electronic device A was unavailable when electronic device C was associated to the user account, the re-encryption key from electronic device A to the electronic device C could not be calculated, thus, in the hypothesis of single-hop PRE, the cloud service cannot send to the electronic device C the content from electronic device A as it cannot re-encrypt it.

FIG. 4 is an illustration on how the method of present invention solves the previous problem. In a first step 400, the user requests to access a given content stored on the cloud database storage from the electronic device C. In step 410, the cloud database server 240 determines that the given content is associated to the electronic device A, the cloud database server 240 then chooses an electronic device among all electronic devices associated to the user account, here for example the electronic device B. The choice can be based for example on the fact that the electronic device B is the master device of the user account, or can be based on the status of the associated electronic devices (availability, bandwidth, processing power of the electronic device, etc.). The presence of the re-encryption key from electronic device A to the electronic device B is a mandatory criterion for the database server to choose the electronic device B. The database server then re-encrypts the content using the re-encryption key from the electronic device A to the electronic device B. In step 411, similar to step 311 in FIG. 3, the cloud database server sends the re-encrypted content to the electronic device B. Steps 420, 421 and 422 are similar to steps 320, 321 and 322 in FIG. 3, at the end the content is re-encrypted using the public key of the electronic device B and sent back to the cloud database server 240. The cloud database server stores the received content in step 430 and re-encrypts it using the re-encryption key from the electronic device B to the electronic device C in step 431. In step 432, the cloud database server 240 sends the re-encrypted content to the electronic device C; said electronic device C receives the content in step 440, decrypts the content using its private key in step 441 and is able to access the decrypted content in step 442.

Figure 5:
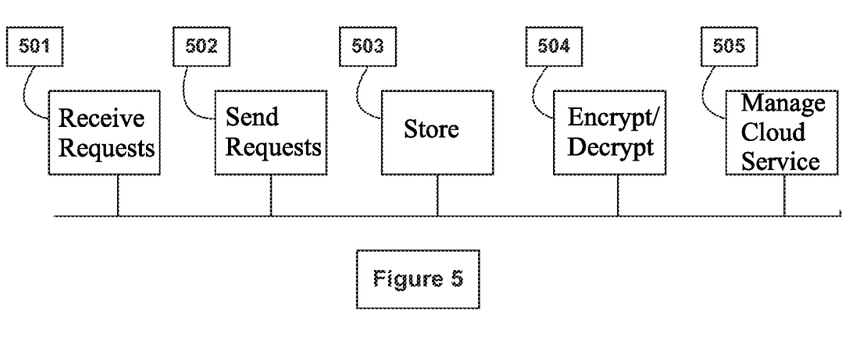
FIG. 5 shows an exemplary embodiment of a database server.

FIG. 5 shows an exemplary embodiment of a cloud database server 240 that can used to implement the present invention. Cloud database server 240 is a server and can be defined as, for example, a secured server or as a database server. This is an illustration of the embodiment of the present invention, as the man skilled in the art may implement a cloud service using multiple database servers and distributing the data storage among them. The database server may integrate in 501 means for receiving requests and in 502 means for sending requests. Means 501 and 502 may have in common at least one network interface, said network interface allowing the cloud database server 240 to connect to a local area network, and possibly to Internet. The database server may have network interfaces to access others database server to constitute a cloud service. Means 503 of the database server allow the database server to store data, said data may comprise content uploaded by users, re-encryption keys, information to identify electronic devices, and, but not limited to, user account parameters, for example authentication data. Means 503 manage entries or subentries within a database related to user account and electronic devices, and are able to associate to a user account some electronic devices, and some content or re-encryption keys to electronic devices. The cloud database server 240 possesses means 504 to encrypt or decrypt content, said means being for example compatible with Proxy Re-Encryption technology. Database server comprises means 505 to manage the cloud service, possibly offering others services related to data storage, means 505 may integrate one or more Central Processing Unit (CPU).

In the present description, cloud data storage was illustrated mainly as a single database. A database may be seen as a single entry for simplification purposes while actually being a distributed database with different physical storages.

The invention claimed is:

1. A method to share a content stored on a secured server between a first electronic device of a user and a second electronic device of the user, different from the first device, the method comprising the following acts performed by the secured server:
    associating said content to a user account and to the first electronic device of the user, wherein the user account is a single user account to which the first and second electronic devices are associated,
    storing an association resulting from the act of associating said content to the user account and to the first electronic device of the user,
    storing the content in an encrypted form as a first-public-key encrypted content, said first-public-key encrypted content being encrypted with a public key of said first electronic device,
    associating said second electronic device with a second electronic device public key and a second electronic device private key,
    storing an association resulting from the act of associating said second electronic device with the second electronic device public key and the second electronic device private key,
    storing a first re-encryption key, said first re-encryption key being configured to re-encrypt the first-public-key encrypted content, said first re-encryption key being calculated using proxy re-encryption (PRE) technology, and further being calculated using a first electronic device private key associated with the first electronic device public key and using the second electronic device public key,
    determining association of the first-public-key encrypted content with the second electronic device,
    re-encrypting the first-public-key encrypted content using the first re-encryption key to generate a re-encrypted content,
    sending the re-encrypted content to the second electronic device with a request asking the second electronic device to decrypt the re-encrypted content using the second electronic device private key, thereby generating a decrypted content, and to encrypt the decrypted content using the second electronic device public key, thereby generating a second-public-key encrypted content,
    receiving from the second electronic device the second-public-key encrypted content that has been encrypted using the second electronic device public key,
    associating the second-public-key encrypted content received from the second electronic device to the second electronic device and the user account,
    storing the second-public-key encrypted content received from the second electronic device in association with said second electronic device and the user account.

2. The method according to claim 1, further comprising, prior to the act of determining the association of the first-public-key encrypted content with the second electronic device:
    receiving a request from a third device for the first-public-key encrypted content associated to the first electronic device, and wherein the act of determining the association of the first-public-key encrypted content with the second electronic device is based on a status of the first electronic device.

3. The method according to claim 1, wherein the act of determining the association of the first-public-key encrypted content with the second electronic device is based on receiving a request to associate the first-public-key encrypted content associated to the first electronic device to the second electronic device.

4. The method according to claim 3, the request further comprising a request to delete the first-public-key encrypted content associated to the first electronic device.

5. The method according to claim 1, wherein the act of determining the association of the first-public-key encrypted content with the second electronic device is based on a status of the first electronic device.

6. The method according to claim 5, wherein the act of determining the association of the first-public-key encrypted content with the second electronic device is further based on a status of the second electronic device.

7. The method according to claim 1, further comprising, after the act of receiving from the second electronic device the second-public-key encrypted content that has been encrypted using the second electronic device public key:
deleting from the secured server the first-public-key encrypted content being associated to the first electronic device and encrypted using the public key of said first electronic device.

8. The method according to claim 1, further comprising, after the act of receiving from the second electronic device the second-public-key encrypted content that has been encrypted using the second electronic device public key:
deleting from the secured server any re-encryption keys from or to the first electronic device.

9. A secured server for sharing content stored on a database between a first electronic device of a user and a second electronic device of the user, different from the first device, wherein the secured server comprises:
a network interface;
a non-transitory computer-readable medium comprising instructions stored thereon; and
a processor configured by the instructions to perform acts comprising:
associating, in the non-transitory computer-readable medium, said content to a user account and to the first electronic device of the user, wherein the user account is a single user account to which the first and second electronic devices are associated,
storing, in the non-transitory computer-readable medium, an association resulting from the act of associating said content to the user account and to the first electronic device of the user,
storing the content in an encrypted form as a first-public-key encrypted content in the non-transitory computer-readable medium, said first-public-key encrypted content being encrypted with a public key of said first electronic device,
associating, in the non-transitory computer-readable medium, said second electronic device with a second electronic device public key and a second electronic device private key,
storing in the non-transitory computer-readable medium an association resulting from the act of associating said second electronic device with the second electronic device public key and the second electronic device private key,
storing a first re-encryption key in the non-transitory computer-readable medium, said first re-encryption key being configured to re-encrypt the first-public-key encrypted content, said first re-encryption key being calculated by the processor using proxy re-encryption (PRE) technology, and further being calculated using a first electronic device private key associated with the first electronic device public key and using the second electronic device public key,
determining association of the first-public-key encrypted content with the second electronic device,
re-encrypting the first-public-key encrypted content using the first re-encryption key to generate a re-encrypted content,
sending, using the network interface, the re-encrypted content to the second electronic device with a request asking the second electronic device to decrypt the re-encrypted content using the second electronic device private key, thereby generating a decrypted content, and to encrypt the decrypted content using the second electronic device public key, thereby generating a second-public-key encrypted content,
receiving, using the network interface, from the second electronic device the second-public-key encrypted content that has been encrypted using the second electronic device public key, and
associating the second-public-key encrypted content received from the second electronic device to the second electronic device and the user account,
storing the second public-key encrypted content received from the second electronic device in association with said second electronic device and the user account in the non-transitory computer-readable medium.

10. A non-transitory storage medium comprising a computer program product stored thereon and executable by a processor in the form of a software agent including at least one software module setup to implement a method to share a content stored on a secured server, between a first electronic device of a user and a second electronic device of the user, different from the first device,
wherein the at least one software module configures the secured sever to perform acts comprising:
associating said content to a user account and to the first electronic device of the user, wherein the user account is a single user account to which the first and second electronic devices are associated,
storing an association resulting from the act of associating said content to the user account and to the first electronic device of the user,
storing the content in an encrypted form as a first-public-key encrypted content, said first-public-key encrypted content being encrypted with a public key of said first electronic device,
associating said second electronic device with a second electronic device public key and a second electronic device private key,
storing an association resulting from the act of associating said second electronic device with the second electronic device public key and the second electronic device private key,
storing a first re-encryption key, said first re-encryption key being configured to re-encrypt the first-public-key encrypted content,
said first re-encryption key being calculated using proxy re-encryption (PRE) technology, and further being calculated using a first electronic device private key associated with the first electronic device public key and using the second electronic device public key,
determining association of the first-public-key encrypted content with the second electronic device,
re-encrypting the first-public-key encrypted content using the first re-encryption key to generate a re-encrypted content, c) sending the re-encrypted content to the second electronic device with a request asking the second electronic device to decrypt the re-encrypted content using the second electronic device private key, thereby generating a decrypted content, and to encrypt the decrypted content using the second electronic device public key, thereby generating a second-public-key encrypted content,
receiving from the second electronic device the second-public-key encrypted content that has been encrypted using the second electronic device public key,
associating the second-public-key encrypted content received from the second electronic device to the second electronic device and the user account, storing the second public-key encrypted content received from the second electronic device in association with said second electronic device and the user account.

11. The non-transitory storage medium according to claim 10, wherein the method further comprises, prior to the determining the association of the first-public-key encrypted content with the second electronic device:

receiving a request from a third device for the first-public-key encrypted content associated to the first electronic device, and wherein the determining of the association of the first-public-key encrypted content with the second electronic device is based on a status of the first electronic device.

12. The non-transitory storage medium according to claim 10, wherein the determining of the association of the first-public-key encrypted content with the second electronic device is based on receiving a request to associate the first-public-key encrypted content associated to the first electronic device to the second electronic device.

13. The non-transitory storage medium according to claim 12, the request further comprising a request to delete the first-public-key encrypted content associated to the first electronic device.

14. The non-transitory storage medium according to claim 10, wherein the determining of the association of the first-public-key encrypted content with the second electronic device is based on a status of the first electronic device.

15. The non-transitory storage medium according to claim 14, wherein the determining of the association of the first-public-key encrypted content with the second electronic device is further based on a status of the second electronic device.

16. The non-transitory storage medium according to claim 10, wherein the method further comprises after the receiving from the second electronic device the second-public-key encrypted content that has been encrypted using the second electronic device public key: deleting from the secured server the first-public-key encrypted content being associated to the first electronic device and encrypted using the public key of said first electronic device.

17. The non-transitory storage medium according to claim 10, wherein the method further comprises after the receiving from the second electronic device the second-public-key encrypted content that has been encrypted using the second electronic device public key: deleting from the secured server any re-encryption keys from or to the first electronic device.

* * * * *